A. F. DRAPER.
AUTOMOBILE SEAT.
APPLICATION FILED FEB. 16, 1910.

1,054,755.

Patented Mar. 4, 1913.

2 SHEETS—SHEET 1.

WITNESSES:

INVENTOR
Arthur F. Draper
BY
ATTORNEY

A. F. DRAPER.
AUTOMOBILE SEAT.
APPLICATION FILED FEB. 16, 1910.
1,054,755. Patented Mar. 4, 1913.
2 SHEETS—SHEET 2.
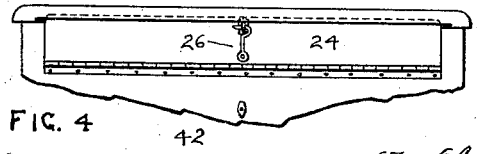
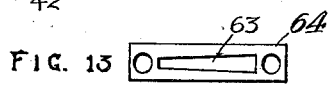
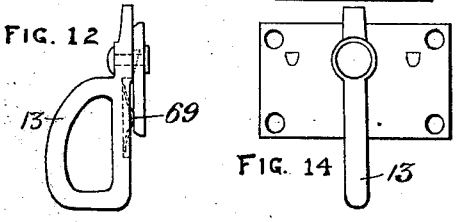
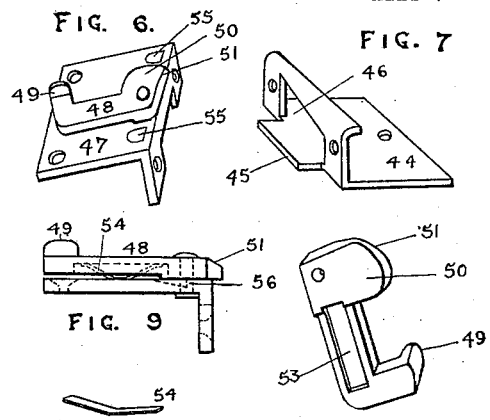
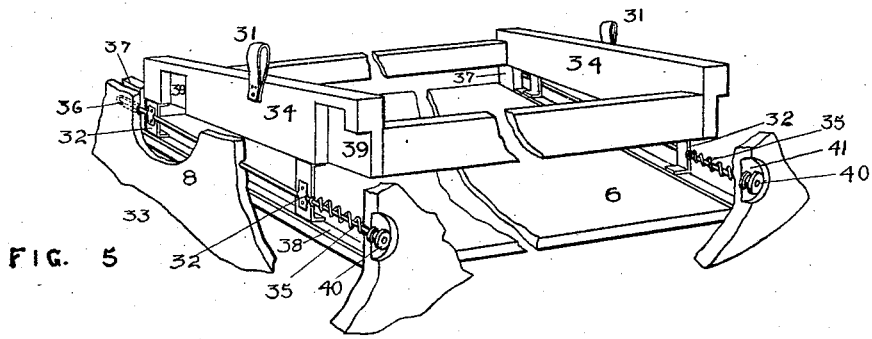
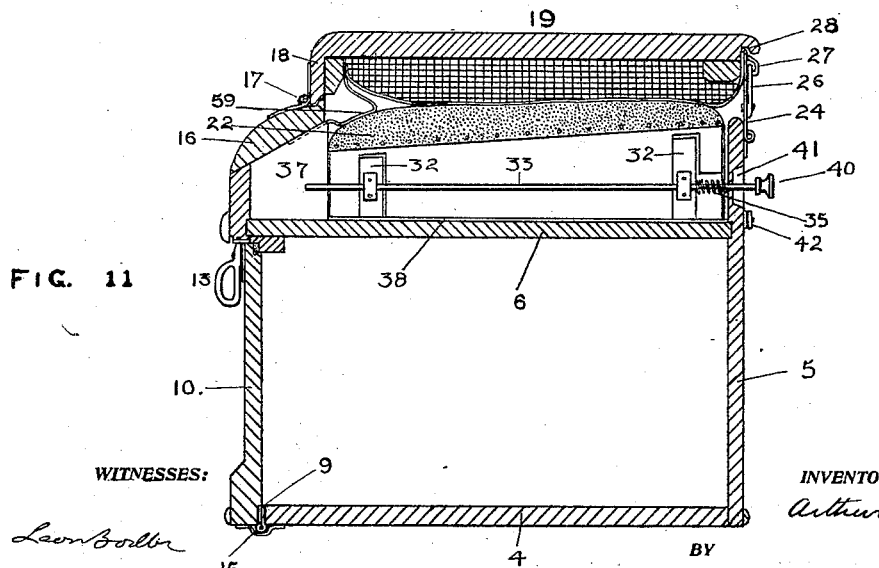
WITNESSES:
INVENTOR
Arthur F. Draper
BY
F. M. Wright
ATTORNEY

UNITED STATES PATENT OFFICE.

ARTHUR F. DRAPER, OF BERKELEY, CALIFORNIA.

AUTOMOBILE-SEAT.

1,054,755.  Specification of Letters Patent.  Patented Mar. 4, 1913.

Application filed February 16, 1910. Serial No. 544,217.

*To all whom it may concern:*

Be it known that I, ARTHUR F. DRAPER, a citizen of Canada, residing at Berkeley, in the county of Alameda and State of California, have invented new and useful Improvements in Automobile-Seats, of which the following is a specification.

The present invention relates to a combined box and collapsible rear seat, for automobiles or other vehicles, and its object is to provide a device of this character which is capacious, convenient in use, durable, water and dust-tight when closed, and of pleasing appearance.

Figure 1:
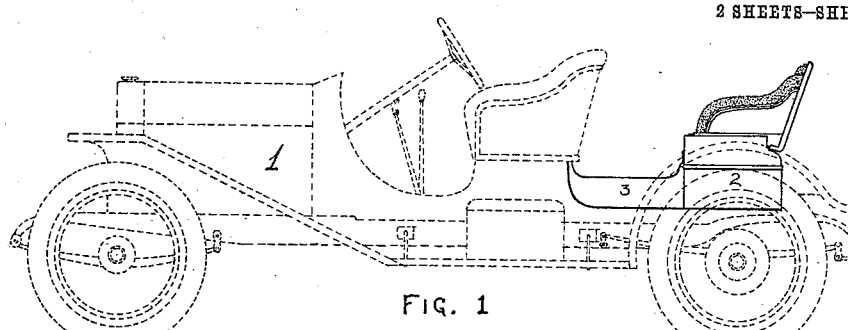
Figure 2:
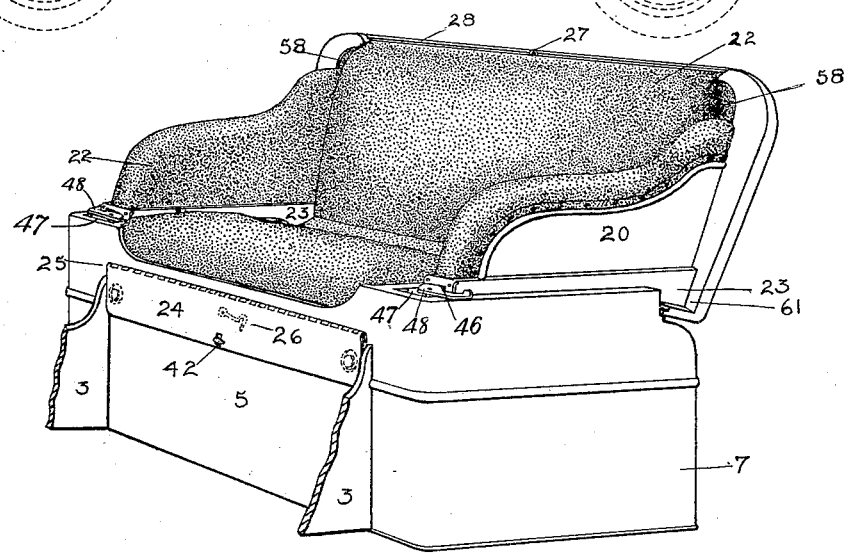
Figure 3:
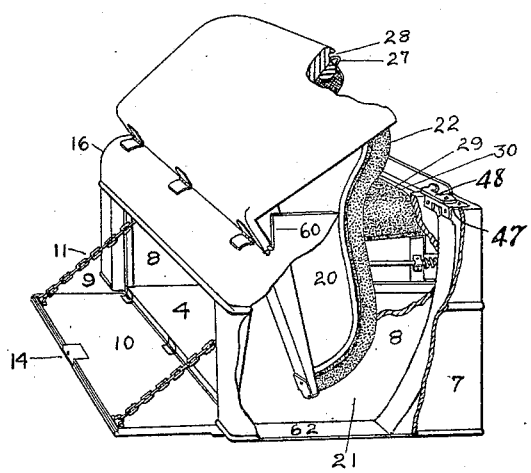

In the accompanying drawing, Figure 1 is a side view showing in dotted lines an automobile to which my invention is applied and in full lines the invention itself; Fig. 2 is a perspective view taken from the front side, of the box and seat detached; Fig. 3 is a perspective view, broken away in parts, taken from the rear, showing the parts in the position in which the box is opened, and the seat back partly raised; Fig. 4 is a detail front view of the box when closed; Fig. 5 is a perspective view of the seat frame, parts being broken away to show the operation of the latches for the seat; Fig. 6 is a perspective view of a catch made for holding the seat back in its elevated position; Fig. 7 is a similar view of the frame with which said catch engages; Fig. 8 is a perspective view of a spring for preventing the rattling of said catch; Fig. 9 is a side view showing the catch, the support therefor, and the spring for the catch in position; Fig. 10 is a perspective view of the under side of the catch, detached; Fig. 11 is a cross sectional view of the device on a reduced scale; Fig. 12 is a side view of the catch for the lid; Fig. 13 is a bottom plan view of the socket plate for said catch; Fig. 14 is a front view of the catch; Fig. 15 is a detail of the spring.

Referring to the drawing, 1 indicates an automobile to which my improved combined box and rear seat is attached. The latter comprises a box-shaped frame or casing 2, connected to the side boards 3 which extend at the sides of the automobile behind the front seat. Said casing comprises a bottom 4, a front wall 5, a top 6, end walls 7, and inner, or false, end walls 8. Hinged to the rear edge of the bottom of the casing, as shown at 9, is a door 10, the upper corners of which are attached in any desired manner, as by chains 11, to inner walls 8. Said door is secured in its closed position by a door fastener 13, or by a lock 14. The door fastener engages a slot 63 in a plate 64 which has a spring 69 to keep it from rattling. Extending beneath and across the joint between the lower edge of the door and the base of the box is a strip of leather 15 to make the same tight, and, if desired, a strip of flexible material may be interposed between the upper edge of the door and the part of the casing which it engages when closed. Said casing, above the opening for the door, is curved in a forward direction, as shown at 16, and hinged to the forward edge thereof, as shown at 17, is a lower or rear offset portion 18, of a seat back 19, the use of the offset portion 18 being to permit the back proper to swing back to a considerable distance and thereby to provide a seat of as great depth as possible. Extending forwardly from said seat are seat ends 20, which, when the back is closed pass down into the recesses 21 between the ends walls 7 and false end walls 8 of the box. Both the seat, the seat back and the seat ends are upholstered, as shown at 22, the upholstering of the latter extending over their upper edges and to a short distance on the outside. To the lower edges of said seat ends are secured comparatively wide bars 23, which are of considerably greater thickness than the thickness of the seat ends including the upholstery, so that, when said seat ends enter said recesses 21, said lower frame bars 23 fully protect the upholstery from abrasion in said recesses. When the seat back is depressed to its lowest position, a flap 24, hinged, as shown at 25, to the front wall of the casing is raised, and a hook 26, pivoted upon the front wall of said flap when so raised, engages a staple 27 secured to the edge of the seat back, and thereby holds it in position. The upper edge of said flap then enters a groove 28, formed in the under side of the front edge of the back when in its closed position, thereby rendering the joint between said flap and seat back watertight.

By reason of the front wall 5 of the casing extending a considerable distance above the top 6, and also on account of the curved upper portion 16 of the casing, above the opening for the door, being of considerable height, there is provided, above the top of the box, a recess 29 of considerable depth to receive the seat 30. When the seat back has been moved back to its open position, the seat is then raised by means of tags 31, and, when thus raised to the proper height, supports 32, secured in pairs upon rods 33, automatically move under the side pieces 34 of the frame of said seat, and support it in its raised position. Said rods 33 extend at the ends of the seat from front to rear of the casing, in horizontal grooves 36 formed in the inner surfaces of the false end walls, as shown in dotted lines in Fig. 5, and coiled springs 35 around said rods press at their front ends against the front wall of the casing and at their rear ends against the front one of the pair of supports. The rear ends of said rods slide in blocks 37, the front edges of which blocks also serve as vertical guides for the rear portions of the ends of the seat when the latter is raised. The seat supports travel upon metallic rails 38, secured to the upper surface of the top of the box. When the seat is in its lower position, said supports are received within recesses 39 formed in the side pieces of the seat frame, but when the seat is raised so that said recesses are above said supports, then, owing to the action of said springs 35, the rods 33 move rearwardly, carrying with them the supports, which are then beneath parts of the side pieces of the seat frame beyond said recesses, and support said seat in its raised position. To lower the seat again, the rods are pulled forward by means of knobs 40, until the supports are immediately beneath said recesses, whereupon the seat drops to its lower position, in which said supports are in said recesses. When the seat is in its raised position, said knobs 40 move backward into recesses 41 formed in the front wall of the casing, so that they do not extend beyond the surface of said front wall, and the flap 24 can then be dropped, covering said knobs, and is retained in this position by a turn catch 42.

The principal reason for providing means whereby the seat can be lowered is to provide additional room for the seat back when it is closed, without increasing the height of the box.

It is desirable that seats in automobiles should slope downward to the rear. For this purpose, the side pieces of the seat frame are made of greater height at the front than at the rear, and the front supports are also made of greater height than the rear supports, the corresponding recess in each side piece being also higher. Consequently when the seat is raised it has a slope due to the excess of height both of the support and of the side wall of the seat frame.

In order to secure the seat back in its raised position, there are secured to the front end of the frame piece of each end wall of the seat back a catch frame 44 having a tongue 45 and a slot 46 above said tongue. Secured to the casing at the top of the end of the recess for said end wall is a catch frame 47 to which is pivoted a catch 48 having a finger 49, and a tongue 50 having a beveled edge 51. When the seat back has been raised, said catch 48 is turned so that the tongue enters said slot 46, and secures the seat back in its upper position. Said slot 46 tapers toward the end to which the tongue moves in its locking position, so that when the catches 48 lock the seat back, said tongues tend to be firmly wedged in said slots, and prevent any loose movement therein. There is also formed on the under side of each catch 48, a groove 53, in which is contained a bent spring 54, which is compressed between said catch plate and the catch, tending to move said catch always away from the catch plate, thereby preventing any rattling of said catch against said catch plate. To prevent the catch from moving around too far, there are formed, in the upper surface of the catch plate, recesses 55 with shoulders 56, which shoulders arrest the spring 54 beneath the catch, if the catch be moved sufficiently far, and then prevent it moving any farther.

At the upper corners of the seat back when open, the upholstery is reduced in thickness, as shown at 58, so that the seat back can swing down to its proper position unobstructed by the catch upon the casing. The joint between the lower edge of the seat back and the curved portion of the casing is covered by a strip 59 of flexible material uniform in appearance with the remainder of the upholstery. The end walls of the casing are each formed at the rear with a square shoulder 60 upon which a square recess 61 formed between the main and offset portion of the seat back fits snugly, when the seat back is in its closed position.

The bottom of the recesses for the end walls of the seat back are formed by metal plates 62, which are here shown as straight, but in case it be desired to make the seat lower, these plates may be curved convexly downward to allow sufficient room for the swinging of the seat back end walls.

I claim:—

1. The combination with a vehicle of a casing having inner and outer end walls forming recesses and a seat back having seat ends adapted to enter the recesses when the casing is closed, the back forming a closure for said casing, substantially as described.

2. In combination with a vehicle, a casing, the casing rising above the top of the box and curving over said top, and a seat back having a lower or rear offset portion hinged to the inner edge of said casing, substantially as described.

3. In combination with a vehicle, a casing, the casing rising above the top of the box and curving over said top, a seat back having a lower or rear offset portion hinged to the inner edge of said casing, and side bars secured to the lower edges of the seat ends, substantially as described.

4. In combination with a vehicle, a casing, the casing rising above the top of the box and curving over said top, a seat back having a lower or rear offset portion hinged to the inner edge of said casing, and a flap hinged to the front wall of the casing, the edge of the flap being adapted to enter a groove in the front edge of the back, substantially as described.

5. In combination with a vehicle, a casing, the casing rising above the top of the box and curving over said top, a seat back having a lower or rear offset portion hinged to the inner edge of said casing, a flap hinged to the front wall of the casing, the edge of the flap being adapted to enter a groove in the front edge of the back, and means for securing said flap in said position, substantially as described.

6. The combination with a vehicle of a box, a seat back hinged to said box, a seat on said box, and means for supporting said seat in an upper position, said seat back having arms extending at substantially right angles therefrom and the box having pockets into which said arms enter.

7. The combination with a vehicle of a box, a seat back hinged to said box, a seat on said box, and means for supporting said seat in an upper or lower position as desired, said seat back having arms extending therefrom and the box having recesses into which said arms enter, substantially as described.

8. The combination of a box, a seat back hinged to said box, a seat on said box, and means for supporting said seat in an upper or lower position as desired, comprising supports and rods to which said supports are secured, said seat having recesses in its walls to receive said supports, springs for moving said supports and rods, when the recesses in said seat are moved out of engagement with said supports, substantially as described.

9. The combination with a vehicle of a box, a seat back hinged to said box, a seat on said box, and means comprising supports and rods to which said supports are secured for supporting said seat in an upper position.

10. The combination with a vehicle of a box, a seat on said box, a seat back hinged to said box, said seat back having arms extending therefrom and the box having recesses into which said arms enter, and means for supporting in a position for use said seat back and arms, substantially as described.

11. The combination with a vehicle of a box, a seat on said box, a seat back hinged to said box, said seat back having arms extending therefrom and the box having recesses into which said arms enter, and means for supporting in a position for use said seat back against backward movement, substantially as described.

12. The combination with a vehicle of a box, a seat on said box, a seat back hinged to said box, said seat back having arms extending therefrom and the box having recesses into which said arms enter, and means for supporting in a position for use said seat back against movement in either direction, substantially as described.

In testimony whereof I have hereunto set my hand in the presence of two subscribing witnesses.

ARTHUR F. DRAPER.

Witnesses:
FRANCIS M. WRIGHT,
D. B. RICHARDS.

Copies of this patent may be obtained for five cents each, by addressing the "Commissioner of Patents, Washington, D. C."